US012689133B2

(12) United States Patent
Li

(10) Patent No.: US 12,689,133 B2
(45) Date of Patent: Jul. 21, 2026

(54) MULTI-BEAM LENS ANTENNA AND ACTIVE LENS ANTENNA SYSTEM

(71) Applicant: Guangzhou Sigtenna Technology Co., Ltd., Guangzhou (CN)

(72) Inventor: Zimeng Li, Guangzhou (CN)

(73) Assignee: Guangzhou Sigtenna Technology Co., Ltd., Guangzhou (CN)

( * ) Notice: Subject to any disclaimer, the term of this patent is extended or adjusted under 35 U.S.C. 154(b) by 359 days.

(21) Appl. No.: 18/222,423

(22) Filed: Jul. 14, 2023

(65) Prior Publication Data

US 2023/0361480 A1 Nov. 9, 2023

Related U.S. Application Data

(63) Continuation of application No. PCT/CN2022/071488, filed on Jan. 12, 2022.

(30) Foreign Application Priority Data

Jan. 14, 2021 (CN) ......................... 202110047779.2

(51) Int. Cl.
*H01Q 21/00* (2006.01)
*H01Q 3/26* (2006.01)
*H01Q 21/20* (2006.01)

(52) U.S. Cl.
CPC ....... *H01Q 21/0031* (2013.01); *H01Q 3/2658* (2013.01); *H01Q 21/205* (2013.01)

(58) Field of Classification Search
CPC ............ H01Q 21/0031; H01Q 3/2658; H01Q 21/205; H01Q 1/246; H01Q 1/42;
(Continued)

(56) References Cited

U.S. PATENT DOCUMENTS 6,218,987 B1 * 4/2001 Derneryd ............... H01Q 25/04 342/373
10,418,716 B2 9/2019 Zimmerman et al.
(Continued)

FOREIGN PATENT DOCUMENTS

CN 1261989 A 8/2000
CN 107968266 A 4/2018
(Continued)

OTHER PUBLICATIONS

International Search Report of PCT Patent Application No. PCT/CN2022/071488 issued on Apr. 24, 2022.

*Primary Examiner* — Dimary S Lopez Cruz
*Assistant Examiner* — Austin M Back

(57) ABSTRACT

Disclosed in the present application is a multi-beam lens antenna and an active lens antenna system; the multi-beam lens antenna includes a columnar lens, N layers of first radiation unit groups and M layers of second radiation unit groups both distributed in a height direction of an outer side surface of the columnar lens; each layer of first radiation unit group includes P first radiation units, and each layer second radiation unit group includes K second radiation units; each layer of first radiation unit radiates P narrow beams with different directions as service beams through the columnar lens, and each layer of second radiation unit radiates F wide beams with different directions as broadcast beams through the columnar lens; and a sector covered by the F broadcast beams of each layer matches a sector covered by the P service beams of each layer.

20 Claims, 8 Drawing Sheets

(58) Field of Classification Search
CPC .... H01Q 19/062; H01Q 25/001; H01Q 15/08; H01Q 19/06; H01Q 1/38
See application file for complete search history.

(56) References Cited

U.S. PATENT DOCUMENTS

| | | | | |
|---|---|---|---|---|
| 10,483,650 | B1 | 11/2019 | Zimmerman et al. | |
| 2004/0061654 | A1* | 4/2004 | Webb | H01Q 25/002 343/754 |
| 2017/0062944 | A1 | 3/2017 | Zimmerman et al. | |
| 2017/0373400 | A1* | 12/2017 | Matitsine | H01Q 21/0031 |
| 2019/0081405 | A1 | 3/2019 | Matitsine et al. | |
| 2020/0059004 | A1 | 2/2020 | Zimmerman et al. | |
| 2021/0384606 | A1* | 12/2021 | Kaistha | H01Q 1/246 |
| 2022/0069927 | A1* | 3/2022 | Abdelmonem | H04L 5/0023 |
| 2022/0247075 | A1* | 8/2022 | Jalili | H01Q 3/30 |

FOREIGN PATENT DOCUMENTS

| | | | | |
|---|---|---|---|---|
| CN | 108432045 | A | 8/2018 | |
| CN | 107968266 | B | * 10/2018 | H01Q 5/20 |
| CN | 108701894 | A | 10/2018 | |
| CN | 109546333 | A | 3/2019 | |
| CN | 109923736 | A | 6/2019 | |
| CN | 107949955 | B | 1/2021 | |
| CN | 214411546 | U | 10/2021 | |
| CN | 110402521 | B | 5/2023 | |

* cited by examiner

MULTI-BEAM LENS ANTENNA AND ACTIVE LENS ANTENNA SYSTEM

CROSS REFERENCE TO RELATED APPLICATIONS

The present application is a Continuation Application of PCT Application No. PCT/CN2022/071488 filed on Jan. 12, 2022, which claims the benefit of Chinese Patent Application No. 202110047779.2 filed on Jan. 14, 2021. All the above are hereby incorporated by reference in their entirety.

FIELD OF THE INVENTION

The present application relates to the technical field of mobile communication, in particular to a multi-beam lens antenna and an active lens antenna system.

BACKGROUND OF THE INVENTION

With the rapid development of technology in recent years, 4G communication is no longer able to meet the current demand and rapid deployment of 5G communication is required. Since the multi-beam lens antenna system possesses the advantages of narrow transmitting beam, high gain, long transmitting distance, covering specific shaped airspace, and low sidelobe with combined feed-source, the multi-beam lens antenna system is widely used in the technical fields of mobile communication, various kinds of satellite communication, electronic confrontation, etc. In addition, the multi-beam lens antenna system may improve the system capacity and communication quality of mobile communication system, therefore, the research on multi-beam lens antenna system is one of the most popular research aspects at present.

Chinese Patent Nos. CN108432045A, CN108701894A and CN109923736A all describe a multi-beam lensed antenna system that divides a large sector of 120 degrees into 2, 3 or 4 smaller sectors, increasing the capacity of the system by increasing the amount of sectors. Each small sector in this lens antenna contains only one pair of dual-polarized antennas, which may only achieve 2T2R. However, in some situations where higher system capacity is required, 4T4R and 8T8R need to be implemented in a community, while in 5G communication systems, at least 8T8R, 16T16R, or even 32T32R and 64T64R should be implemented.

U.S. Patent Nos. US20200059004A1, US20170062944A1, U.S. Pat. Nos. 10,483,650B1, 10,418,716B2 and US2019081405A1, and Chinese Patent Nos. CN201680049538.9 and CN201880017747.4, all describe a multi-beam lens antenna; this multi-beam lens antenna includes multiple spherical lenses arranged in a cylindrical cylinder, and then a radiator is arranged on one side of each spherical lens; this design is too cumbersome, and the design, assembly and production require strict control of process and cost; another design is to place multiple radiators on one side of a large lens sphere to form a multi-beam antenna, and place radiators along the meridian and latitude near the sphere. The direction of its beam is not the same, so this design of multi-beam lens antenna has difficulties in forming a large-scale MIMO system. In addition, this lens antenna may not generate broadcast beams, which has some limitations in the use of TDD system.

SUMMARY OF THE INVENTION

Provided in the present application, as a first objective, is a multi-beam lens antenna, which may provide wide beams as broadcast beams and be beneficial to increase the system capacity of the mobile communication system.

Provided in the present application, as a second objective, is an active lens antenna system, which may provide wide beams as broadcast beams and be beneficial to increase the system capacity of the mobile communication system.

In order to achieve the first objective mentioned above, provided in the present application is a multi-beam lens antenna, including a columnar lens, N layers of first radiation unit group and M layers of second radiation unit group both distributed in a height direction of an outer side surface of the columnar lens; each layer of first radiation unit group includes P first radiation units arranged in an array on the outer side surface of the columnar lens, and each layer second radiation unit group includes K second radiation units arranged in an array on the outer side surface of the columnar lens; each layer of first radiation unit radiates P narrow beams with different directions as service beams through the columnar lens, and each layer of second radiation unit radiates F wide beams with different directions as broadcast beams through the columnar lens; and a sector covered by the F broadcast beams of each layer matches a sector covered by the P service beams of each layer, in which: $N \geq 2$, $P \geq 2$, $M \geq 1$, $K \geq 1$, $1 \leq F \leq K$.

Preferably, the multi-beam lens antenna of the present application further includes a reflecting plate; the first radiation unit and the second radiation unit are mounted on the reflecting plate; and a central axis of a plane in which the reflecting plate is located is parallel to a geometric axis of the columnar lens or forms an acute angle with a geometric axis of the columnar lens.

Preferably, the multi-beam lens antenna of the present application further includes a power divider or a power combiner, used for each layer of K second radiation units to radiate F wide beams with different directions.

Preferably, the multi-beam lens antenna of the present application further includes a radio remote unit, used for each layer of K second radiation units to radiate F wide beams with different directions.

Preferably, the multi-beam lens antenna of the present application further includes a plurality of radio remote units, in which each radio remote unit is connected to each first radiation unit correspondingly; the radio remote unit is used for the first radiation unit to radiate narrow beams.

Preferably, the multi-beam lens antenna of the present application further includes a plurality of radio remote units; each radio remote unit is connected to each first radiation unit correspondingly to form a basic active unit; and a phase and an amplitude assigned to each basic active unit are adjusted by software to achieve tracking and scanning of beams.

Preferably, the narrow beams radiated by the first radiation unit between two adjacent layers of the first radiation unit group are staggered with each other so that the narrow beams radiated by one of the layers of the first radiation unit group cover an overlapping area between the narrow beams radiated by the adjacent layers of the first radiation unit group.

Preferably, the first radiation unit or the second radiation unit is a single-polarized antenna or dual-polarized antenna.

Preferably, the first radiation unit or the second radiation unit is a dipole antenna, a patch oscillator antenna, an array antenna consisting of dipole antennas or an array antenna consisting of patch oscillator antennas.

Preferably, the multi-beam lens antenna of the present application further includes a phase shifter, used for adjusting beams of the multi-beam lens antenna.

Preferably, a shape of the columnar lens is a cylinder, quasi-cylinder, elliptical cylinder, or quasi-elliptical cylinder.

Preferably, the multi-beam lens antenna of the present application further includes a radome; the radome includes a main body and an accessory body; the main body is used for accommodating the columnar lens and the accessory body is used for accommodating N layers of the first radiation unit group and the M layers of the second radiation unit group; and the radome further includes an end-cap provided on an end of the radome.

In order to achieve the second objective mentioned above, provided in the present application is an active lens antenna system, including the multi-beam lens antenna mentioned above and an active unit integrated by the multi-beam lens antenna.

Preferably, the active lens antenna system is able to track and scan beams on a vertical plane or a horizontal plane.

By adopting the multi-beam lens antenna of the present application, the first radiation unit may radiate a plurality of narrow beams as service beams through the columnar lens, and the second radiation unit may radiate wide beams as broadcast beams through the columnar lens; a sector covered by the F broadcast beams matches a sector covered by the P service beams, in which each service beam covers a sub-sector and each sub-sector radiates N service beams. Therefore, the multi-beam lens antenna and the active lens antenna system of the present application may be applied in TDD system and are beneficial to increase the system capacity of the mobile communication system.

DETAILED DESCRIPTION OF THE PREFERRED EMBODIMENTS

In order to describe detailed the technical content, constructed features and achieved effects of the present application, detailed description is provided below in conjunction with the embodiment and with the attached drawings.

Figure 1:
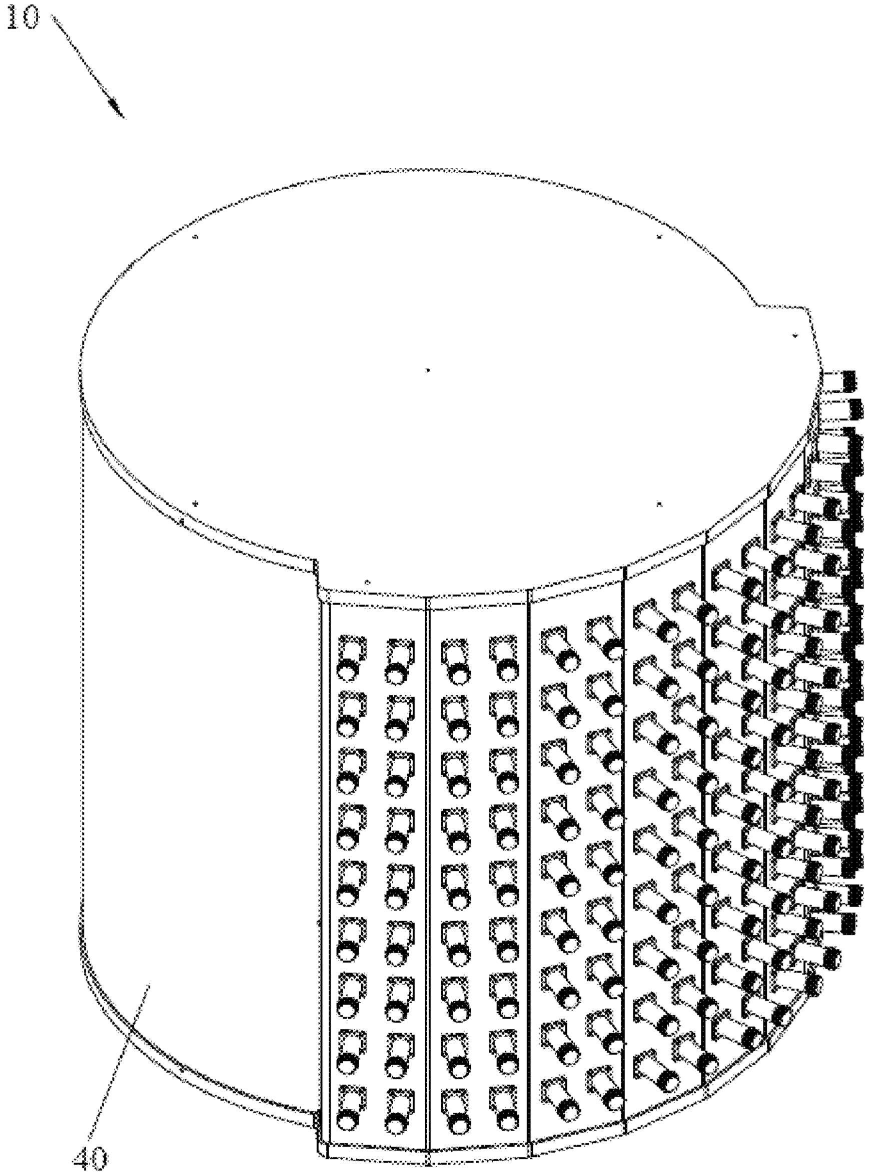
FIG. 1 is a structural diagram of the multi-beam lens antenna according to the embodiment of the present application.
Figure 2:
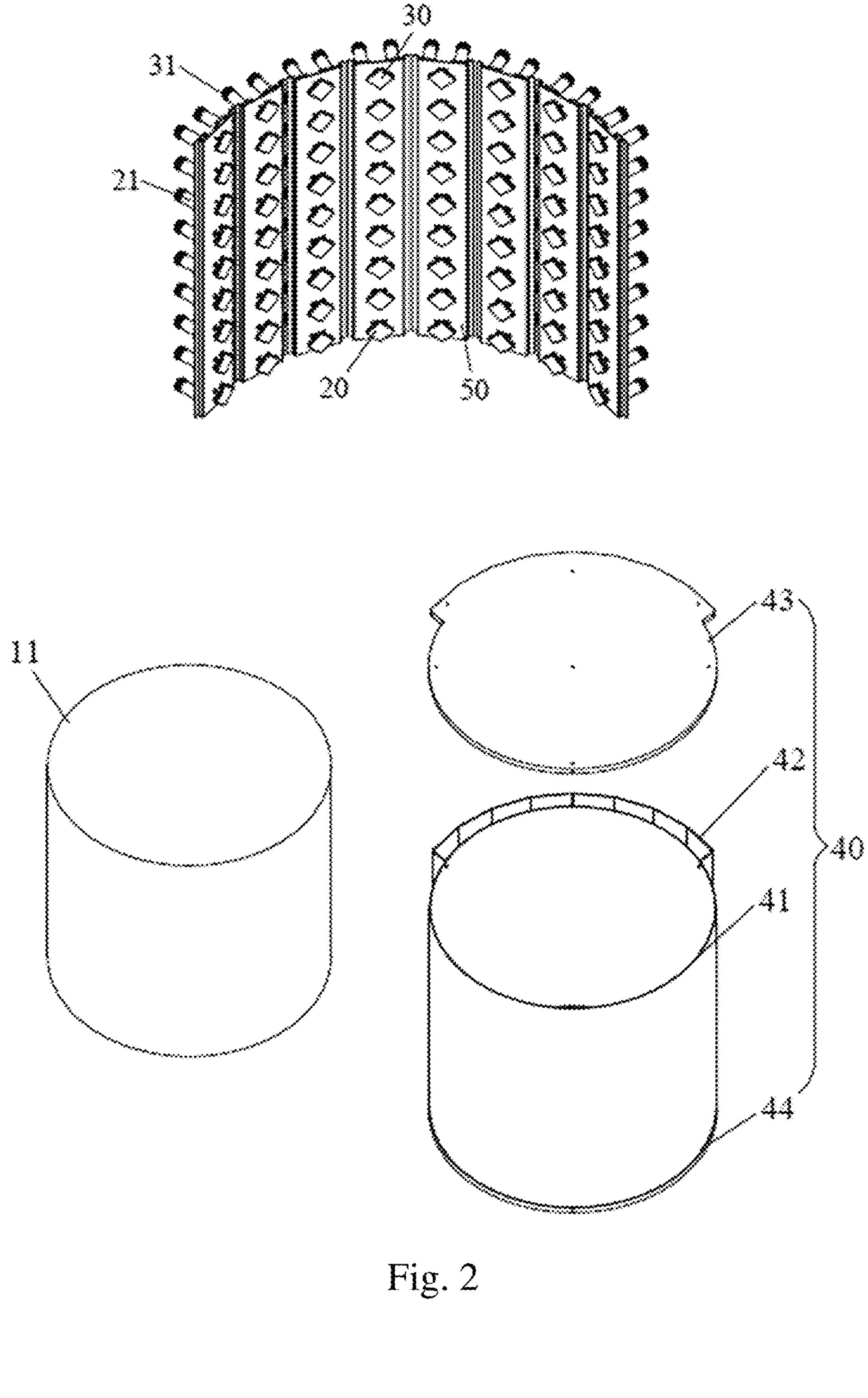
FIG. 2 is a first exploded view of the multi-beam lens antenna according to the embodiment of the present application.
Figure 3:
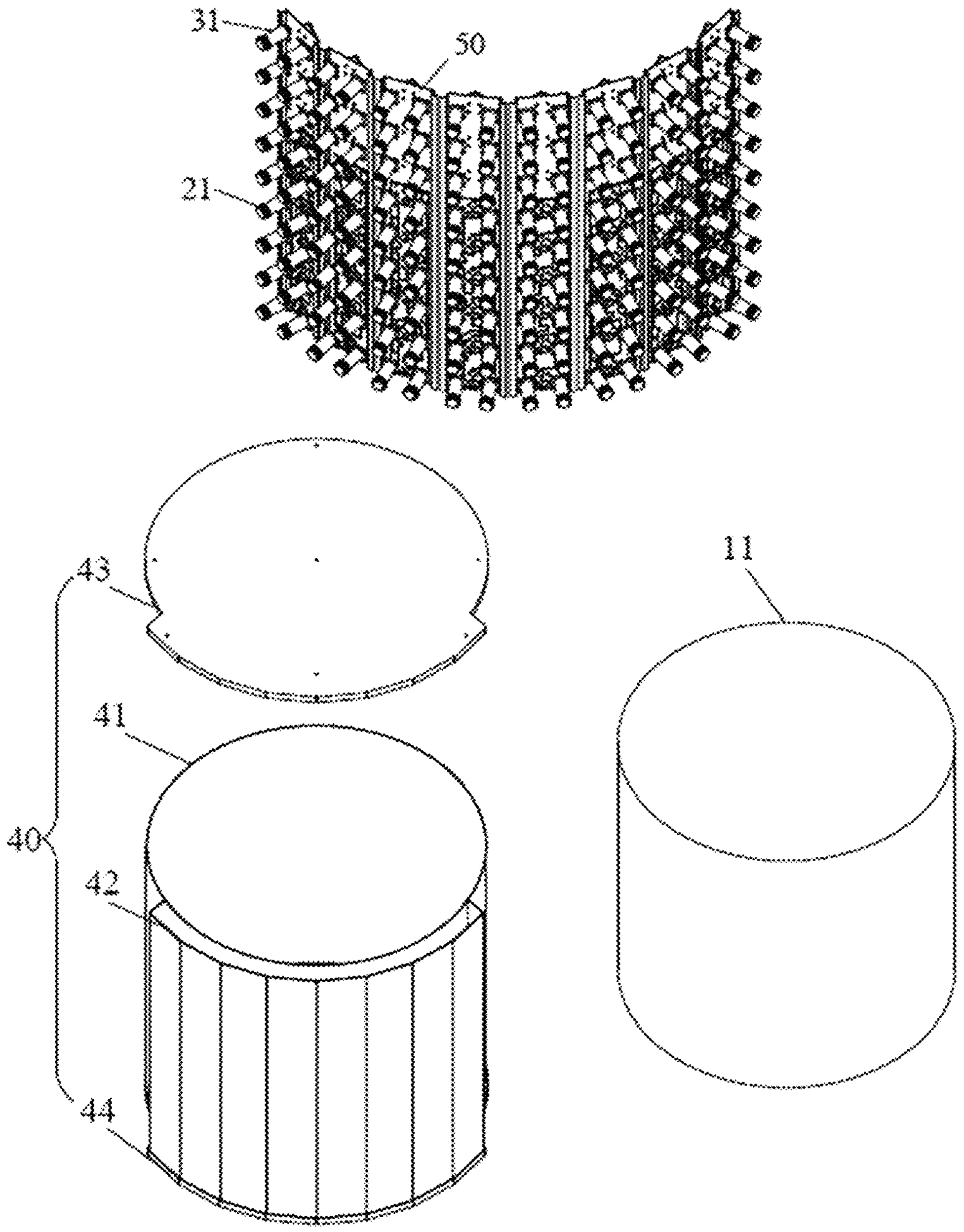
FIG. 3 is a second exploded view of the multi-beam lens antenna according to the embodiment of the present application.
Figure 4:
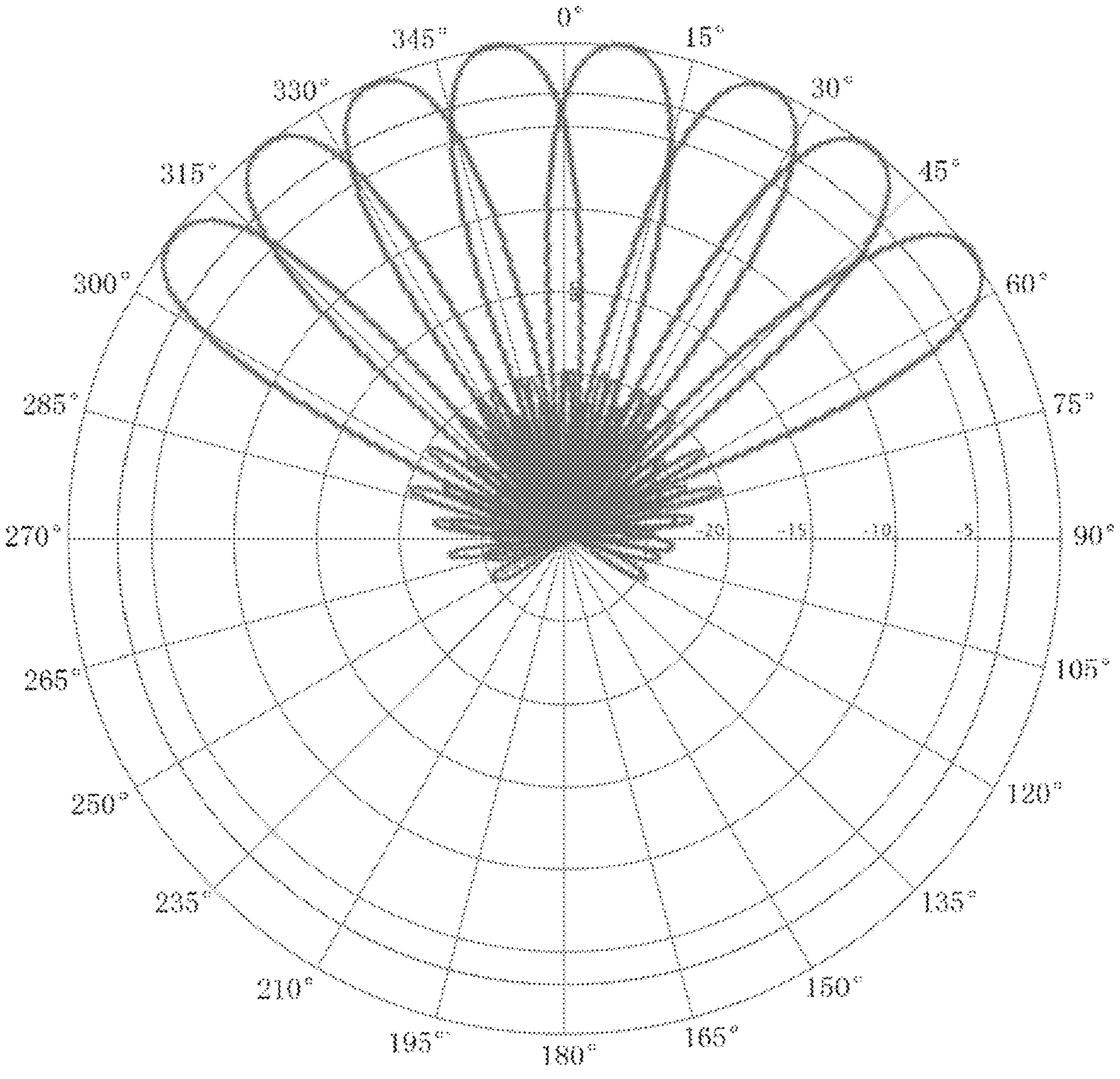
FIG. 4 is a directional diagram in a horizontal plane of the first radiation unit group of a single layer in the multi-beam lens antenna according to the embodiment of the present application.
Figure 5:
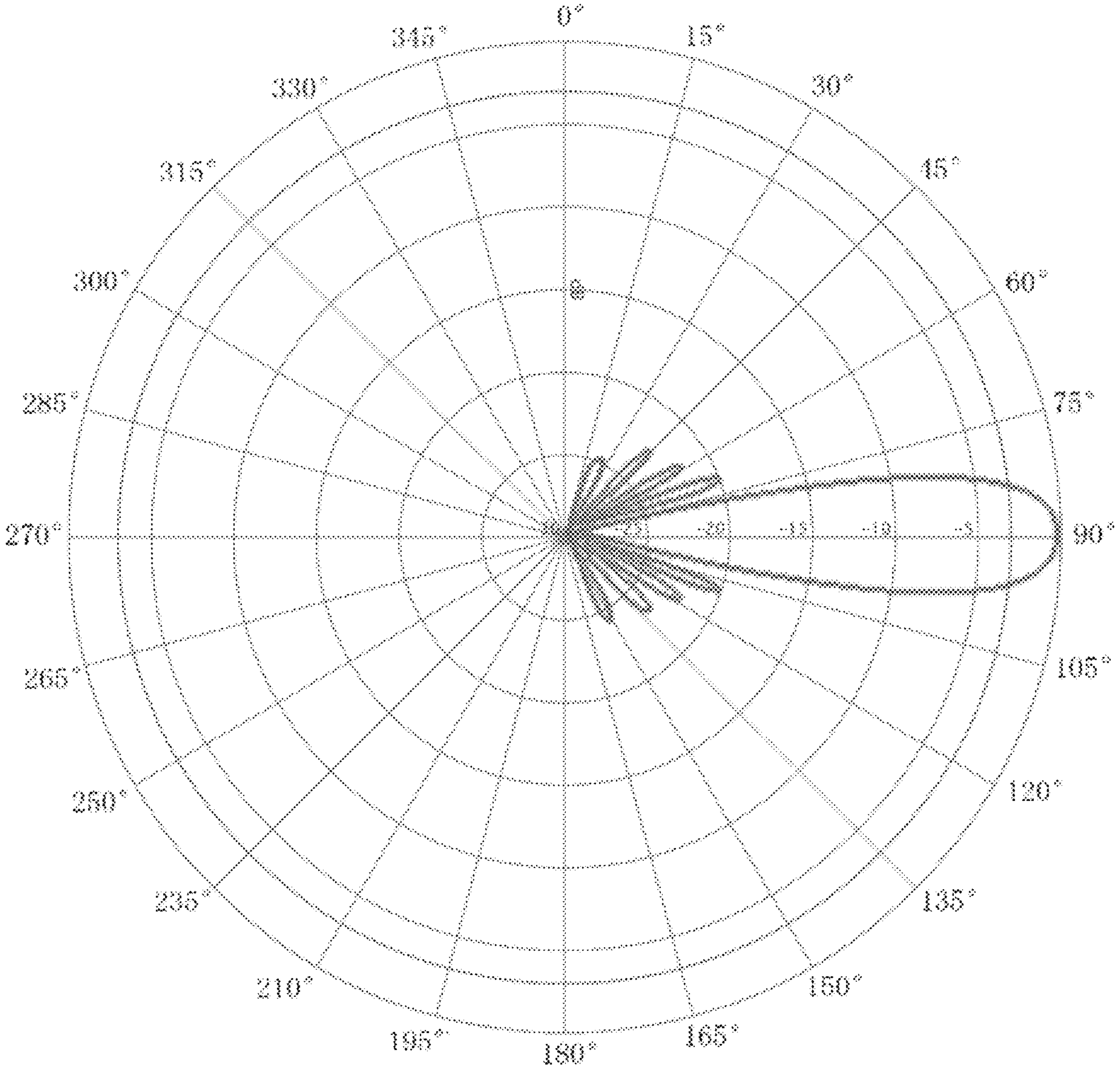
FIG. 5 is a directional diagram in a vertical plane of the first radiation unit group of a single layer in the multi-beam lens antenna according to the embodiment of the present application.
Figure 6:
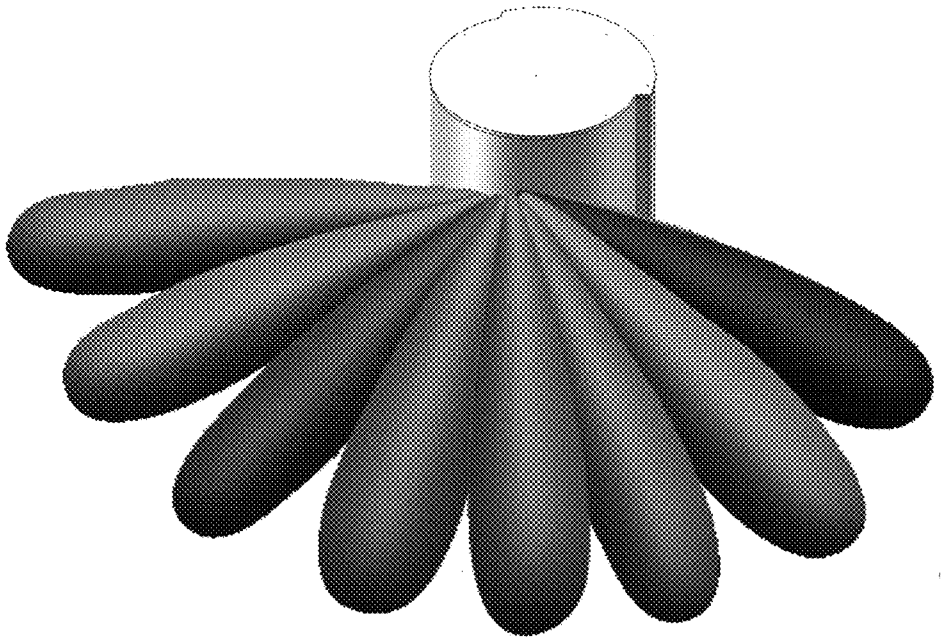
FIG. 6 is a 3D directional diagram of the first radiation unit group of a single layer in the multi-beam lens antenna according to the embodiment of the present application.

Referring to FIG. 1 to FIG. 3, disclosed in the present application is a multi-beam lens antenna 10, including a columnar lens 11, N layers of first radiation unit group and M layers of second radiation unit group both distributed in a height direction of an outer side surface of the columnar lens 11; the first radiation unit group and the second radiation unit group are distributed on the same side of the columnar lens 11; each layer of first radiation unit group includes P first radiation units 20 arranged in an array on the outer side surface of the columnar lens 11, and each layer second radiation unit group includes K second radiation units 30 arranged in an array on the outer side surface of the columnar lens 11; each layer of first radiation unit radiates P narrow beams with different directions as service beams through the columnar lens 11, and each layer of second radiation unit radiates F wide beams with different directions as broadcast beams through the columnar lens 11; and a sector covered by the F broadcast beams of each layer matches a sector covered by the P service beams of each layer, in which: $N\geq2$, $P\geq2$, $M\geq1$, $K\geq1$, $1\leq F\leq K$.

The multi-beam lens antenna 10 of the present application may provide F sectors covered by broadcast beams, and each layer of the first radiation unit group may radiate P sectors covered by service beams, in which each service beam covers a sub-sector, and N identical narrow beams with same direction may be generated in each sub-sector. Therefore, the multi-beam lens antenna 10 of the present application may be applied in TDD system and are beneficial to increase the system capacity of the mobile communication system. Additionally, the columnar lens 11 enables the multi-beam lens antenna 10 to realize more gain by less radiation unit so as to reduce the volume of the antenna and the loss of power; the columnar lens 11 possess a good sidelobe suppression effect, which may lead to high isolation and small mutual coupling among the beams and reduce the interference among the beams.

In the present embodiment, N equals eight; P equals eight; M equals one; K equals eight; and F equals one. That is, eight layers of the first radiation unit group and one layer of the second radiation unit group are arranged in an array on the outer side surface of the columnar lens 11; the first radiation unit group includes eight first radiation units 20, and the second radiation unit group includes eight second radiation units 30. Each first radiation unit group radiates eight narrow beams with different directions as service beams through the columnar lens 11, and the second radiation unit group radiates one wide beam as a broadcast beam through the columnar lens 11. Referring to FIG. 4 to FIG. 8, the multi-beam lens antenna 10 in the present embodiment may provide a wide beam as broadcast beam covering a sector of 120°, and provide eight narrow beams as service beams covering a sector of 120°, in which each service beam covers a sub-sector of 15°, and each sub-sector may generate eight identical narrow beams with same direction as service beams to realize the tracking of user.

Figure 9:
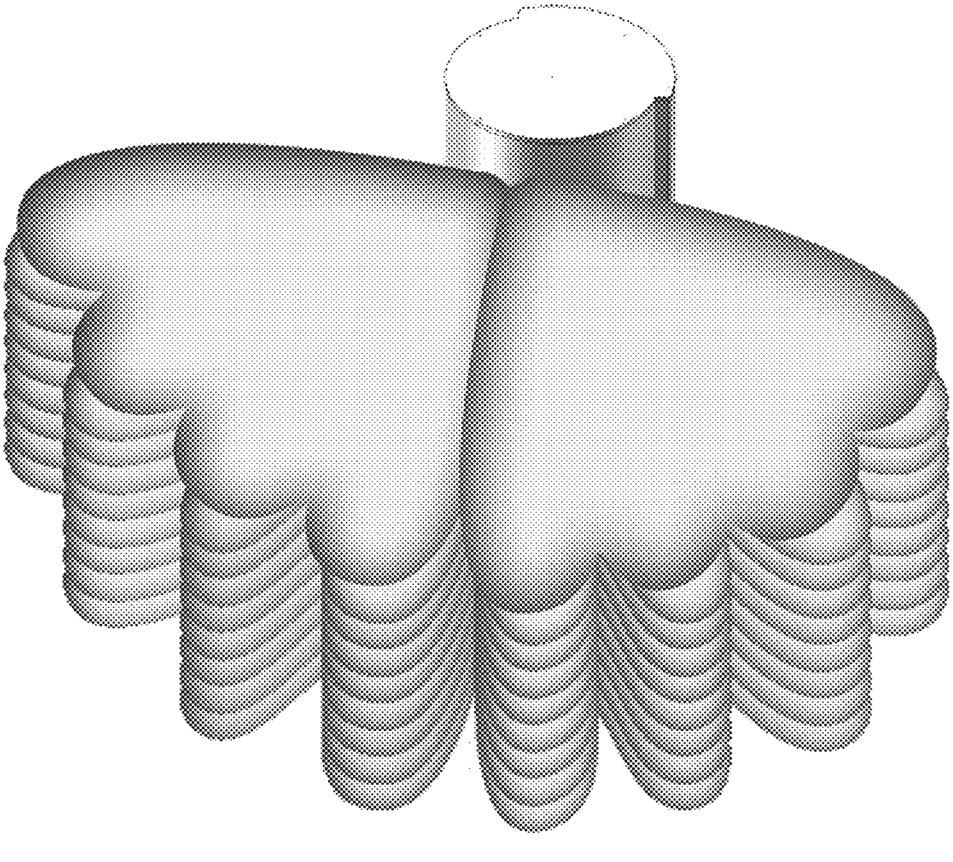
FIG. 9 is a 3D directional diagram of the multi-beam lens antenna according to another embodiment of the present application.

In another embodiment, referring to FIG. 9, N equals eight; P equals eight; M equals one; K equals eight; and F equals two. That is, eight layers of the first radiation unit group and one layer of the second radiation unit group are arranged in an array on the outer side surface of the columnar lens 11; the first radiation unit group includes eight first radiation units 20, and the second radiation unit group includes eight second radiation units 30. Each first radiation unit group radiates eight narrow beams with different directions as service beams through the columnar lens 11, and the second radiation unit group radiates two wide beams as broadcast beams through the columnar lens 11.

Admittedly, in the present application, the set value of N, M, P, K and F as well as the positional relationships of the first radiation unit group and the second radiation unit group are not limited to the specific embodiments mentioned above, which may also be adjusted based on the applied requirements in practice.

Referring to FIG. 2 and FIG. 3, the multi-beam lens antenna 10 of the present embodiment further includes a reflecting plate 50; the first radiation unit 20 and the second radiation unit 30 are mounted on the reflecting plate 50; and a central axis of a plane in which the reflecting plate 50 is located is parallel to a geometric axis of the columnar lens 11 or forms an acute angle with a geometric axis of the columnar lens 11. Admittedly, the reflecting plate 50 is not limited to the present embodiment. For example, the reflecting plate 50 may be provided as a separate structure, that is, each first radiation unit 20 and each second radiation unit 30 are mounted on an independent reflecting plate respectively.

The multi-beam lens antenna 10 of the present application further includes a power divider or a power combiner, used for each layer of K second radiation units 30 to radiate F wide beams with different directions. In the present embodiment, the power divider or the power combiner enables eight second radiation units 30 to radiate one wide beam as a broadcast beam. Additionally, feed terminals 31 of each second radiation unit 30 are connected to input ends of the power divider or a power combiner respectively. Admittedly, adoption of the power divider or the power combiner is not limited in the present application; adoption of other passive devices may also enable K second radiation units 30 to radiate F wide beams.

In the other embodiment, the multi-beam lens antenna 10 further includes a radio remote unit, used for each layer of K second radiation units 30 to radiate F wide beams with different directions as broadcast beams. Admittedly, adoption of the radio remote unit is not limited in the present application; adoption of other active devices may also enable K second radiation units 30 to radiate F wide beams.

In some other embodiments of the present application, the multi-beam lens antenna 10 may also enable K second radiation units 30 to radiate F wide beams by software settings.

The multi-beam lens antenna further includes a plurality of radio remote units, in which each radio remote unit is connected to each first radiation unit 20 correspondingly; the radio remote unit is used for the first radiation unit 20 to radiate narrow beams.

In some embodiments, each radio remote unit is connected to each first radiation unit 20 correspondingly to form a basic active unit; and a phase and an amplitude assigned to each basic active unit are adjusted by software to achieve tracking and adjusting of beams, which may flexibly manage the scanning and tracking of beams of the multi-beam lens antenna 10.

Figure 7:
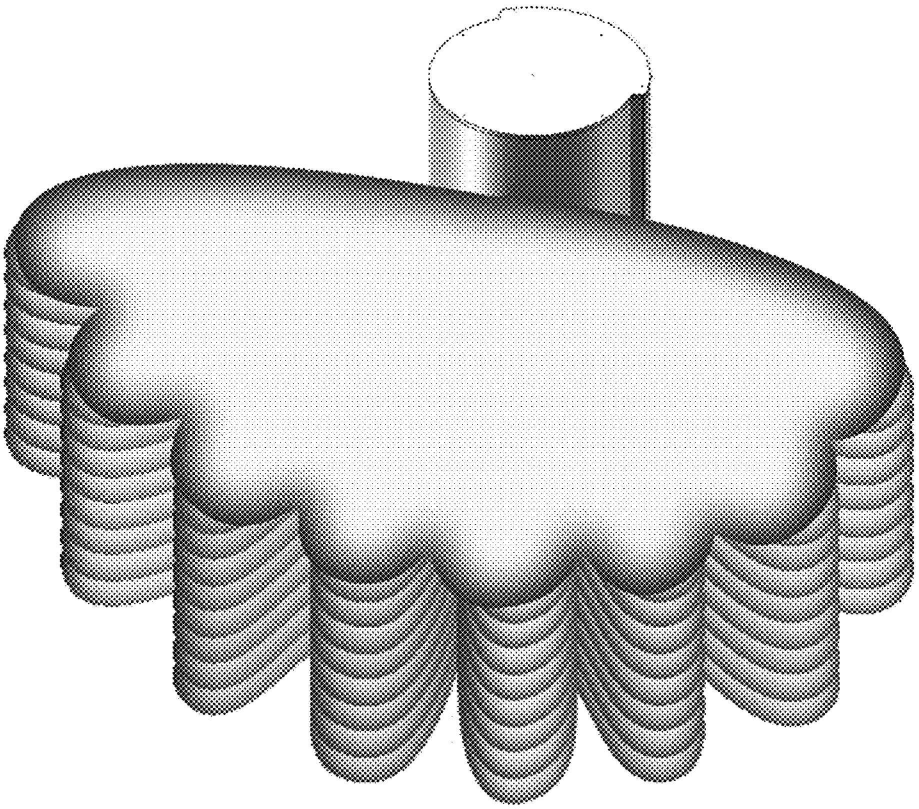
FIG. 7 is a 3D directional diagram of the multi-beam lens antenna according to the embodiment of the present application.
Figure 8:
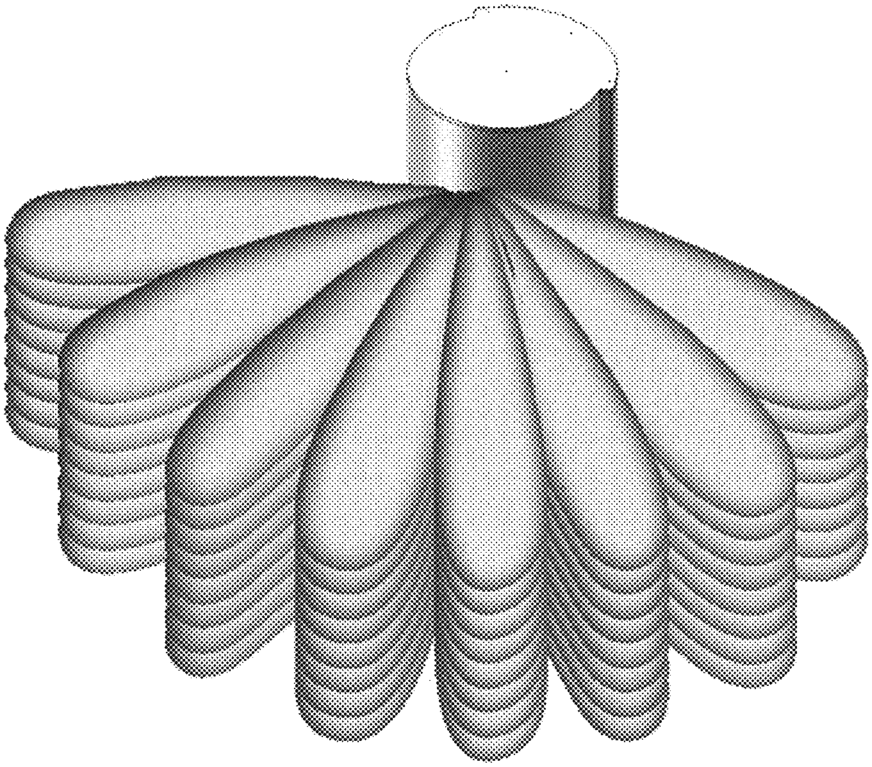
FIG. 8 is a 3D directional diagram of the first radiation unit group in the multi-beam lens antenna according to the embodiment of the present application.
Figure 10:
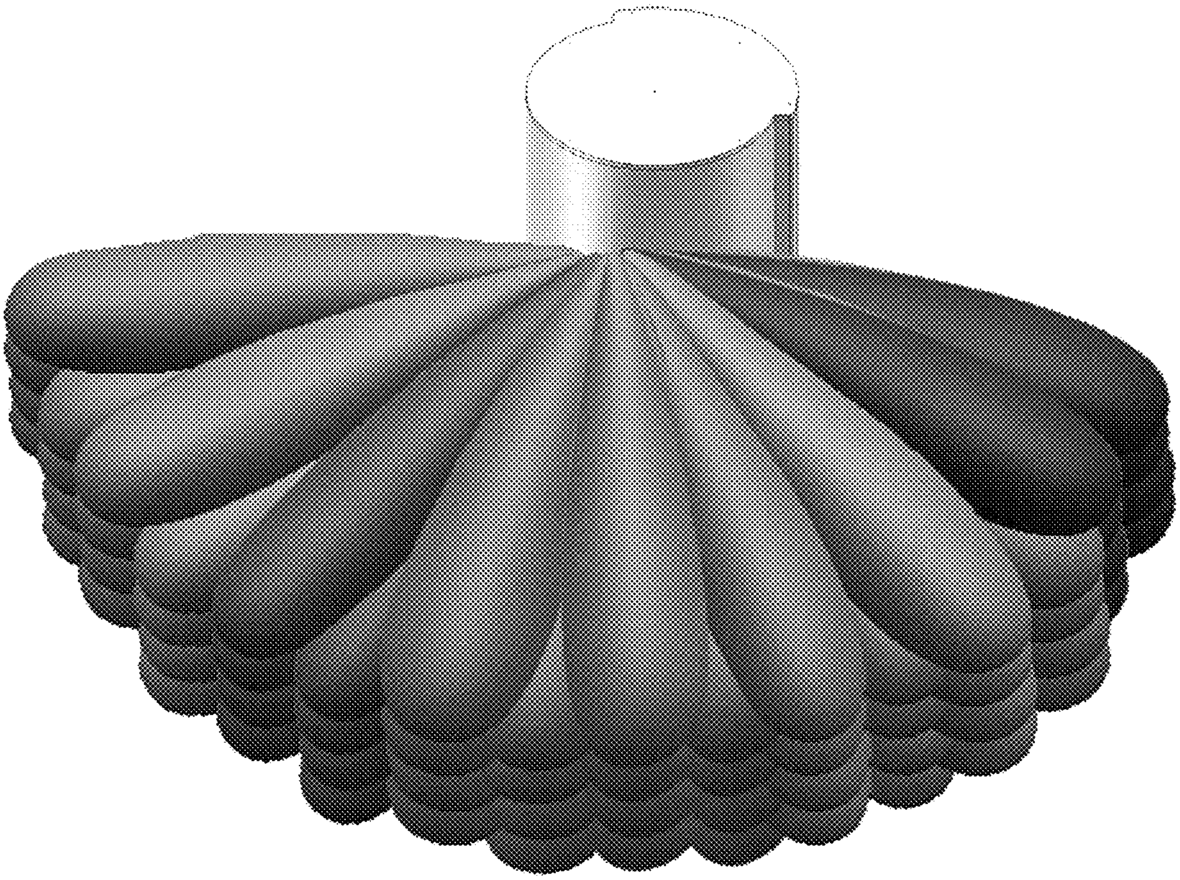
FIG. 10 is a 3D directional diagram of the first radiation unit group in the multi-beam lens antenna according to another embodiment of the present application.

In the embodiment shown as FIG. 7 to FIG. 9, P service beams radiated by N layers of the first radiation unit group of the multi-beam lens antenna 10 are aligned and distributed in a height direction of the columnar lens 11. However, in some other embodiments, as shown in FIG. 10, in order to improve the covering effect of the multi-beam lens antenna 10, the narrow beams radiated by the first radiation unit 20 between two adjacent layers of the first radiation unit group are staggered with each other so that the narrow beams radiated by one of the layers of the first radiation unit group cover an overlapping area between the narrow beams radiated by the adjacent layers of the first radiation unit group, so as to improve the covering effect of the multi-beam lens antenna 10. Admittedly, it is sufficient that merely P service beams radiating from at least two layers of the first radiation unit group are staggered with each other.

In the multi-beam lens antenna 10 of the present application, the first radiation unit 20 or the second radiation unit 30 is a single-polarized antenna or dual-polarized antenna.

Further, the first radiating units 20 are ±45° dual-polarized antennas; each first radiating unit 20 has two feed terminals 21, one for +45° polarization and the other for −45° polarization. In the specific example of FIG. 1 to FIG. 3, the multi-beam lens antenna 10 includes eight layers of the first radiation unit group; each layer of the first radiation unit group includes eight first radiation units 20; eight identical ±45° dual-polarized beams may be generated in each sub-sector; and therefore, each sub-sector is capable of 16T16R. If the amount of layers N of the first radiation unit group is set by the multi-beam lens antenna 10 to four, sixteen, thirty-two, etc., then 8T8R, 32T32R, 64T64R, etc. may be realized in each sub-sector. Therefore, the multi-beam lens antenna 10 of the present application may increase the system capacity of the mobile communication system. Admittedly, the arrangement of the first radiation unit 20 is not limited to the present embodiment in the present application.

By adopting the multi-beam lens antenna 10 of the present application, the first radiation unit 20 or the second radiation unit 30 is a dipole antenna, a patch oscillator antenna, an array antenna consisting of dipole antennas or an array antenna consisting of patch oscillator antennas. If the first radiation unit 20 is an array antenna consisting of dipole antennas or patch oscillator antennas, the gain of narrow beams radiated by the first radiation unit 20 may be further increased. Admittedly, the first radiation unit 20 and the second radiation unit 30 of the present application are not limited to the specific embodiment mentioned above.

Further, the multi-beam lens antenna 10 also includes a phase shifter, used for adjusting beams of the multi-beam lens antenna 10.

In the multi-beam lens antenna 10 of the present application, a shape of the columnar lens 11 is a cylinder, quasi-cylinder, elliptical cylinder, or quasi-elliptical cylinder. As embodiments shown in FIG. 1 to FIG. 10, the shape of the columnar lens 11 is provided as a cylinder; in some other embodiments, by adopting a shape of elliptical cylinder or quasi-elliptical cylinder, the volume of the multi-beam lens antenna 10 may be further reduced.

Referring to FIG. 1 to FIG. 3, the multi-beam lens antenna 10 of the present application further includes a radome 40; the radome 40 includes a main body 41 and an accessory body 42; the main body 41 is used for accommodating the columnar lens 11 and the accessory body 42 is used for accommodating N layers of the first radiation unit group and the M layers of the second radiation unit group. Additionally, in the present embodiment, the radome 40 further includes a first end-cap 43 and a second end-cap 44, in which the first end-cap 43 and the second end-cap 44 are provided at the upper and lower ends of the radome 40 respectively. Admittedly, the amount of the end-cap in the present application is not limited to the specific embodiment mentioned above.

Disclosed in the present application is also an active lens antenna system, including the multi-beam lens antenna 10 mentioned above and an active unit integrated by the multi-beam lens antenna 10.

Further, the active lens antenna system of the present application is able to track and scan beams on a vertical plane or a horizontal plane.

The above disclosure is only better embodiments of the present application, which serves to facilitate the understanding and implementation by those skilled in the art, which certainly may not be used to limit the scope of the present application. Therefore, the equivalent changes made in accordance with the scope of the present application still belong to the scope covered by the present application.

The invention claimed is:

1. A multi-beam lens antenna, characterized in that the multi-beam lens antenna comprises a columnar lens, N layers of first radiation unit group and M layers of second radiation unit group both distributed in a height direction of an outer side surface of the columnar lens; each layer of first radiation unit group comprises P first radiation units arranged in an array on the outer side surface of the columnar lens, and each layer second radiation unit group comprises K second radiation units arranged in an array on the outer side surface of the columnar lens; each layer of first radiation unit radiates P narrow beams with different directions as service beams through the columnar lens, and each layer of second radiation unit radiates F wide beams with different directions as broadcast beams through the columnar lens; and a sector covered by the F broadcast beams of each layer matches a sector covered by the P service beams of each layer, wherein N≥2, P≥2, M≥1, K≥1, 1≤F≤K.

2. The multi-beam lens antenna according to claim 1, characterized by further comprising a reflecting plate; the first radiation unit and the second radiation unit are mounted on the reflecting plate; and a central axis of a plane in which the reflecting plate is located is parallel to a geometric axis of the columnar lens or forms an acute angle with a geometric axis of the columnar lens.

3. The multi-beam lens antenna according to claim 1, characterized by further comprising a power divider or a power combiner, used for each layer of K second radiation units to radiate F wide beams with different directions.

4. The multi-beam lens antenna according to claim 1, characterized by further comprising a radio remote unit, used for each layer of K second radiation units to radiate F wide beams with different directions.

5. The multi-beam lens antenna according to claim 1, characterized by further comprising a plurality of radio remote units, wherein each radio remote unit is connected to each first radiation unit correspondingly; the radio remote unit is used for the first radiation unit to radiate narrow beams.

6. The multi-beam lens antenna according to claim 1, characterized by further comprising a plurality of radio remote units; each radio remote unit is connected to each first radiation unit correspondingly to form a basic active unit; and a phase and an amplitude assigned to each basic active unit are adjusted by software to achieve tracking and scanning of beams.

7. The multi-beam lens antenna according to claim 1, characterized in that the narrow beams radiated by two adjacent layers of the first radiation unit group are staggered with each other so that the narrow beams radiated by one of the layers of the first radiation unit group cover an overlapping area between the narrow beams radiated by the adjacent layers of the first radiation unit group.

8. The multi-beam lens antenna according to claim 1, characterized in that the first radiation unit or the second radiation unit is a single-polarized antenna or dual-polarized antenna.

9. The multi-beam lens antenna according to claim 1, characterized in that the first radiation unit or the second radiation unit is a dipole antenna, a patch oscillator antenna, an array antenna consisting of dipole antennas or an array antenna consisting of patch oscillator antennas.

10. The multi-beam lens antenna according to claim 1, characterized by further comprising a phase shifter, used for adjusting beams of the multi-beam lens antenna.

11. The multi-beam lens antenna according to claim 1, characterized in that a shape of the columnar lens is a cylinder, quasi-cylinder, elliptical cylinder, or quasi-elliptical cylinder.

12. The multi-beam lens antenna according to claim 1, characterized by further comprising a radome; the radome comprises a main body and an accessory body; the main body is used for accommodating the columnar lens and the accessory body is used for accommodating N layers of the first radiation unit group and the M layers of the second radiation unit group; and the radome further comprises an end-cap provided on an end of the radome.

13. An active lens antenna system, characterized by comprising the multi-beam lens antenna as claimed in claim 1, and an active unit integrated by the multi-beam lens antenna.

14. An active lens antenna system, characterized by comprising the multi-beam lens antenna as claimed in claim 2, and an active unit integrated by the multi-beam lens antenna.

15. An active lens antenna system, characterized by comprising the multi-beam lens antenna as claimed in claim 3, and an active unit integrated by the multi-beam lens antenna.

16. An active lens antenna system, characterized by comprising the multi-beam lens antenna as claimed in claim 4, and an active unit integrated by the multi-beam lens antenna.

17. The active lens antenna system according to claim 13, characterized in that the active lens antenna system is able to track and scan beams on a vertical plane or a horizontal plane.

18. The active lens antenna system according to claim 14, characterized in that the active lens antenna system is able to track and scan beams on a vertical plane or a horizontal plane.

19. The active lens antenna system according to claim 15, characterized in that the active lens antenna system is able to track and scan beams on a vertical plane or a horizontal plane.

20. The active lens antenna system according to claim 16, characterized in that the active lens antenna system is able to track and scan beams on a vertical plane or a horizontal plane.

* * * * *